United States Patent [19]
Kitagawa et al.

[11] Patent Number: 6,024,670
[45] Date of Patent: Feb. 15, 2000

[54] CONTROL APPARATUS FOR AUTOMATIC TRANSMISSIONS

[75] Inventors: Ato Kitagawa, Tokyo; Kazushi Sanada, Kanagawa-ken; Hirohiko Totsuka; Kenichi Oshima, both of Shizuoka-ken, all of Japan

[73] Assignee: Jatco Corporation, Fuji, Japan

[21] Appl. No.: 09/016,412

[22] Filed: Jan. 30, 1998

[30] Foreign Application Priority Data

Feb. 6, 1997 [JP] Japan ................................ 9-038410

[51] Int. Cl.$^7$ ........................................ F16D 13/00
[52] U.S. Cl. ............................................. 477/109
[58] Field of Search .................................. 477/107, 109, 477/110, 111, 143, 156; 701/54, 59

[56] References Cited

U.S. PATENT DOCUMENTS

| | | | |
|---|---|---|---|
| 4,933,851 | 6/1990 | Ito et al. | 477/107 |
| 5,239,895 | 8/1993 | Kroger | 477/109 |
| 5,303,614 | 4/1994 | Sakai et al. | 477/158 |
| 5,355,568 | 10/1994 | Kammeri et al. | 477/109 |
| 5,476,425 | 12/1995 | Shiraishi et al. | 477/109 |
| 5,573,476 | 11/1996 | Minowa et al. | 477/109 |
| 5,772,555 | 6/1998 | Minowa et al. | 477/109 |
| 5,776,030 | 7/1998 | Minowa et al. | 477/109 |
| 5,779,594 | 7/1998 | Minowa et al. | 477/156 |
| 5,792,021 | 8/1998 | Minowa et al. | 477/107 |

*Primary Examiner*—Dirk Wright
*Attorney, Agent, or Firm*—Blank Rome Comisky & McCauley LLP

[57] ABSTRACT

Disclosed herein is a control apparatus for an automatic transmission. The control apparatus comprises an oil pressure control section for controlling engagement transition oil pressure which is supplied to friction engaging elements so that what is changed by a speed-change is changed along a locus of a predetermined target value. Also, the control apparatus comprises an engine torque control section for controlling a quantity of change in engine output torque during a speed-change so that a parameter whose value changes in parallel to a speed changing operation has an optimum change characteristic. The engagement transition oil pressure is corrected based on the quantity of change in the engine output torque in controlling the engagement transition oil pressure, and the quantity of change in the engine output torque is corrected based on the engagement transition oil pressure in controlling the quantity of change in the engine output torque.

9 Claims, 14 Drawing Sheets

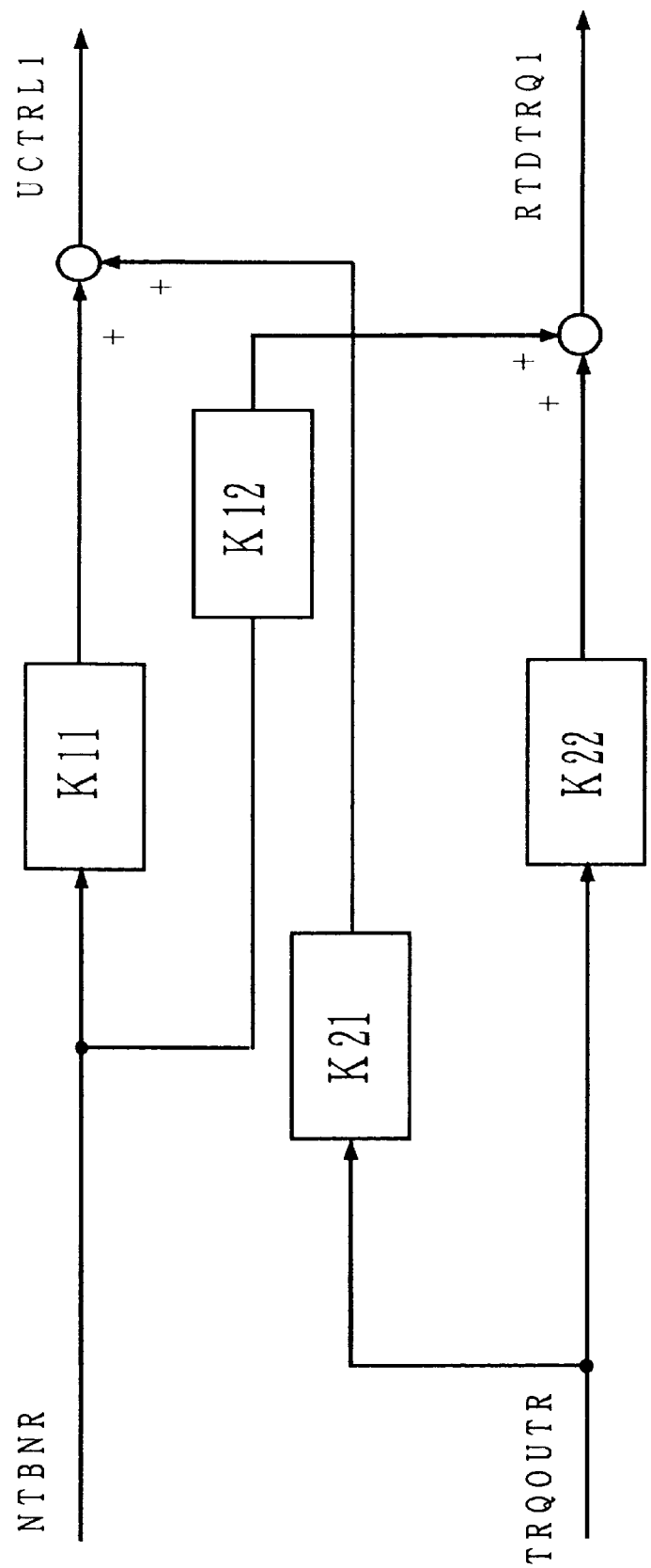
F I G. 2

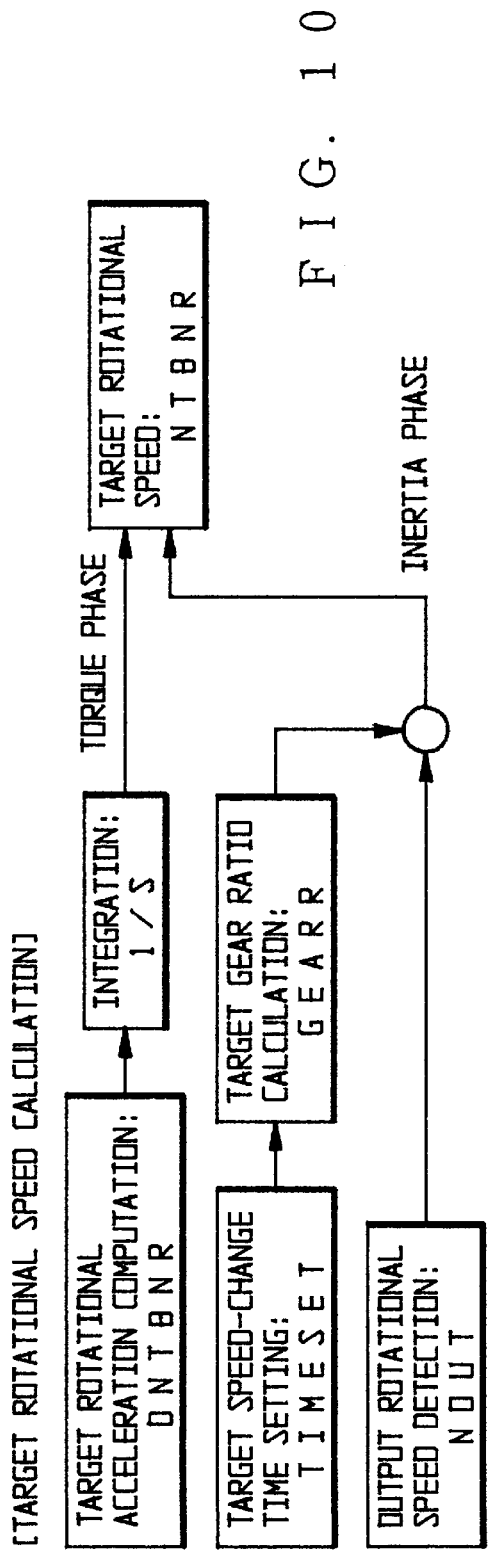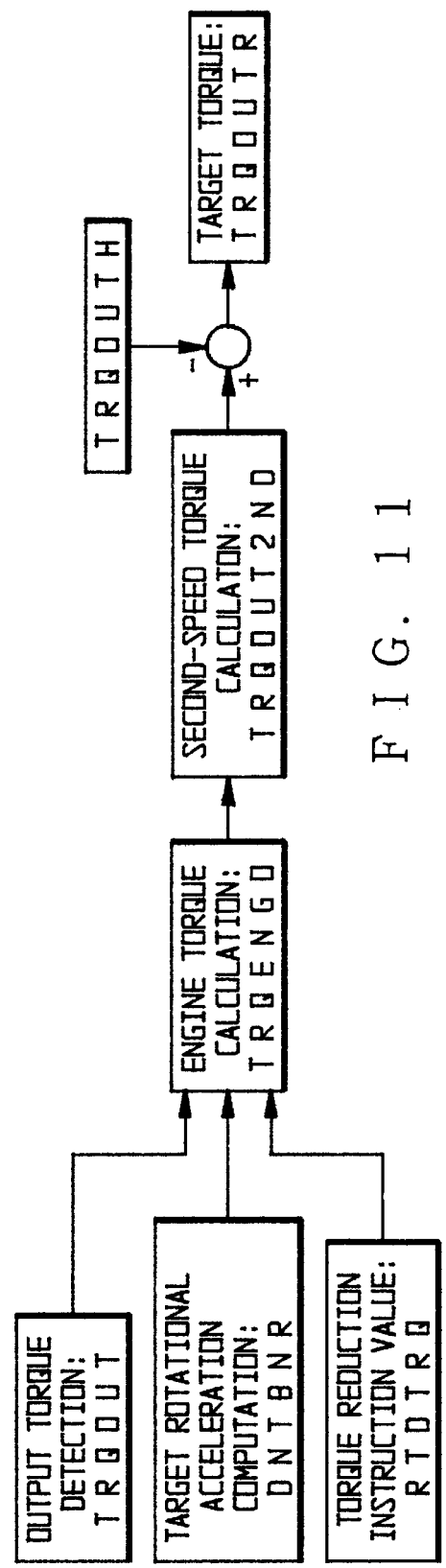

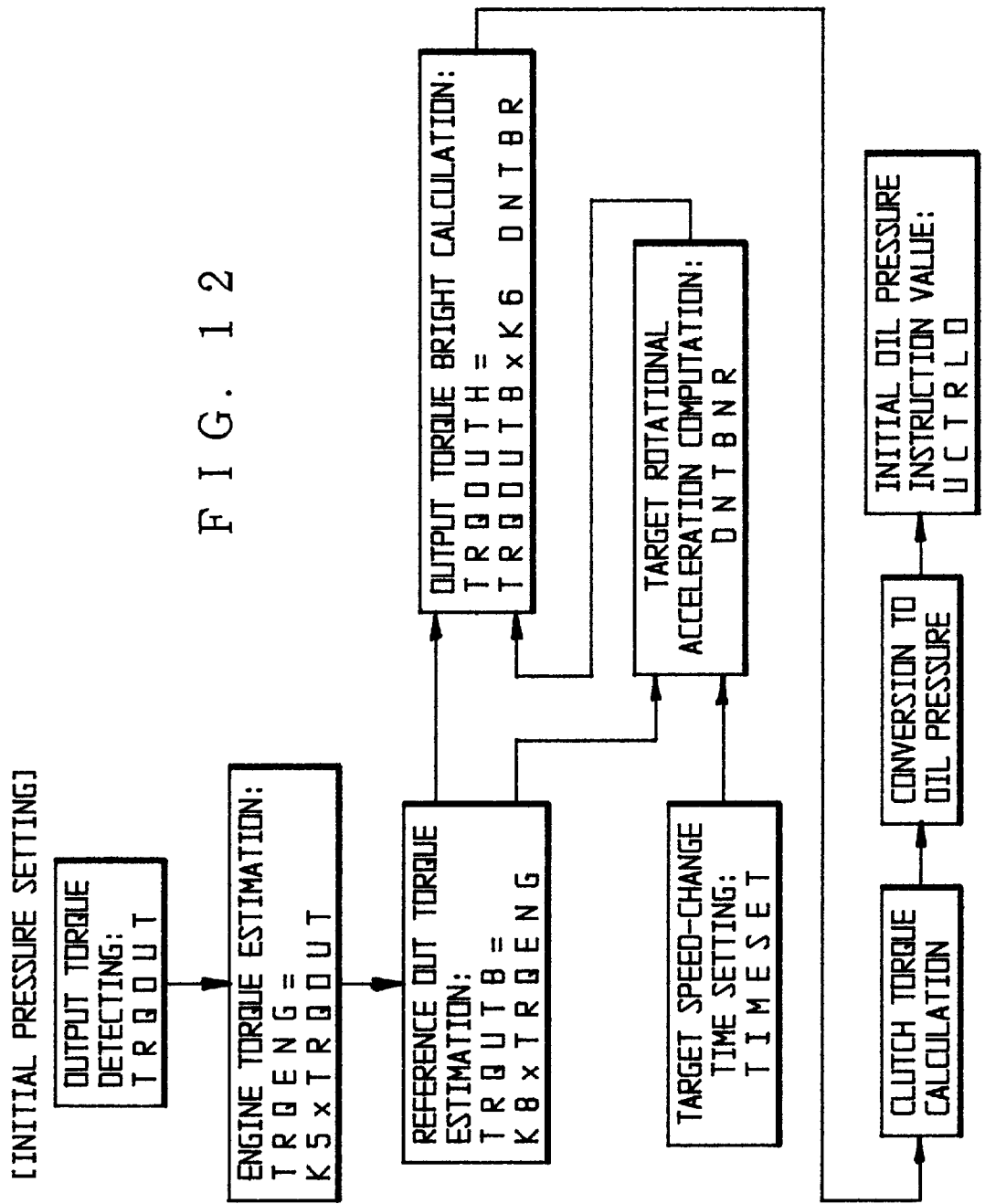

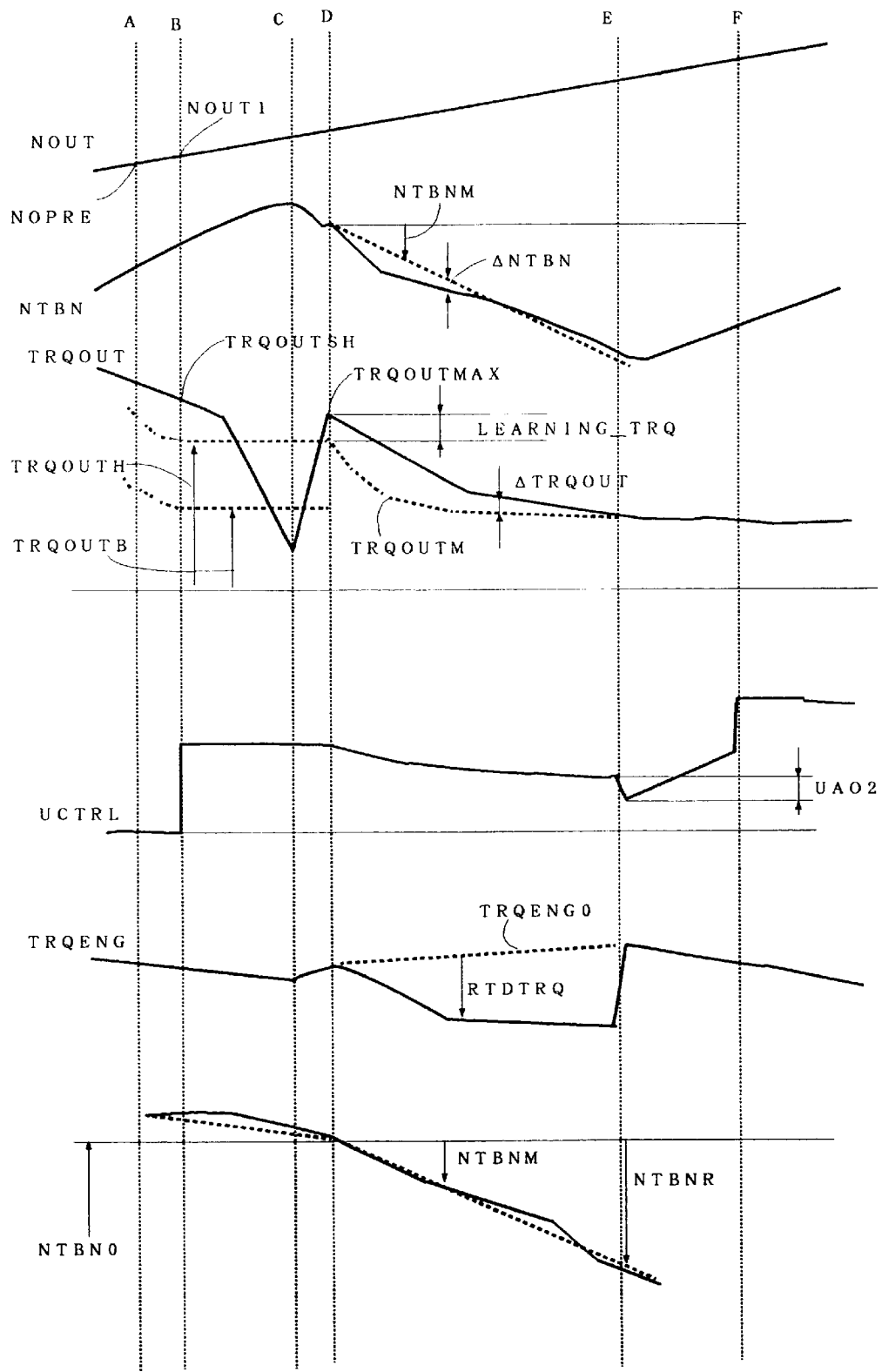
F I G. 1 4

CONTROL APPARATUS FOR AUTOMATIC TRANSMISSIONS

FIELD OF THE INVENTION

The present invention relates to a control apparatus for automatic transmissions, and more particularly to a control apparatus for automatic transmissions which sets the target values of turbine rotational speed and transmission output shaft torque being changed and also prevents interference between the control quantities of the turbine rotational speed and transmission output shaft torque.

DESCRIPTION OF THE RELATED ART

In commonly used automatic transmissions for vehicles, engine speed is input via a torque converter, and is changed and output to a propeller shaft (axle side) by a gear shift mechanism with a plurality of sets of planetary gears.

The stages of speed-change in a hydraulic control type of automatic transmission are switched by supplying oil pressure to friction engaging elements or stopping the supply of oil pressure to the friction engaging elements. In the supply or stoppage of oil pressure to the friction engaging elements, it has become important for the friction engaging elements to have an appropriate transient characteristic to reduce speed-changing shock.

A conventional control apparatus for an automatic transmission is disclosed, for example, in Japan Laid-Open Patent Publication No. SHO 63-212137. In this control apparatus, the rotational speed of a member whose rotational speed is changed by execution of a speed-change (for example, the rotational speed of the turbine shaft, each clutch, and brake drum of an automatic transmission, and engine speed) is detected and the engagement transition oil pressure on the friction engaging elements is controlled so that the detected rotational speed of the member changes along the locus of a target rotational speed which should be traced by the member after a speed-change. The target rotational speed may be any control value if it changes by a speed-change. For example, it may be turbine rotational speed or a rate of change in a gear ratio or a rate of change in engine speed. By performing the aforementioned control, the speed changing time is made constant, thereby aiming at the compatibility of a reduction in speed-changing shock and an enhancement in the durability of the friction engaging elements.

On the other hand, another control apparatus is disclosed, for example, in Japan Laid-Open Patent Publication No. SHO 61-119433. In this control apparatus the output torque of the engine is controlled so that, when speed changing is performed, transmission output shaft torque, for example, changes optimally. With this control, the control apparatus has aimed to change the locus of a change in the output shaft torque so that the driver does not have a feeling of physical disorder, even if there were a secular change in engaged elements or there were manufacturing fluctuation (quality fluctuation) in manufactured parts.

In the control apparatus described in the aforementioned first publication (Japan Laid-Open Patent Publication No. SHO 63-212137), the energy (i.e., inertia force of the automatic transmission and input torque from the engine) that is absorbed by the friction engaging elements will be the same if a point at which speed changing is performed is the same, and consequently, a reduction in the speed-changing shock and an enhancement in the durability of the friction engaging elements can be achieved to a certain degree. However, there is a limit to the setting of a target value.

That is, when speed changing is performed, both rotational speed fluctuation and torque fluctuation occur by the switching of a combination of gears between the input and output of the automatic transmission. These fluctuations will cause speed-changing shock. On the other hand, in order to reduce speed-changing shock, the friction engaging elements, for example, can be slid. However, sliding will cause the occurrence of energy and increase the amount of generated heat, so the durability of the engaging elements will be worse. In addition, the speed changing time becomes long and therefore the response becomes worse. For this reason, in the case where the aforementioned target values are set, they are set in an appropriate range where a compromise is made between a reduction in the speed-changing shock and an enhancement in the durability of the friction engaging elements.

Hence, it is conceived that the control described in the aforementioned second publication (Japan Laid-Open Patent Publication No. SHO 61-119433) is performed in parallel with the control described in the aforementioned first publication (Japan Laid-Open Patent Publication No. SHO 63-212137). In the control apparatus described in the aforementioned second publication, transmission output shaft torque is detected and an input torque quantity from the engine during a speed change is changed to reduce the energy that is absorbed by the friction engaging elements. Therefore, by performing this control in parallel, it is possible to complete a speed-change in a short time and with less speed-changing shock.

However, in the case where the control as set forth in the aforementioned first publication and the control as set forth in the aforementioned second publication are simply performed in parallel at the same time, the following problems arise due to interference between control quantities.

Where both controls are performed in parallel, the rotational speed of a member whose rotational speed is changed by execution of a speed-change (for example, the turbine shaft of the automatic transmission) is detected, and the engagement transition oil pressure on the friction engaging elements is controlled so that the detected rotational speed of the member changes along the locus of a target rotational speed which should be traced by the member after a speed-change. At the same time, the output shaft torque of the automatic transmission is detected, and the input torque quantity from the engine during a speed-change (in other words, engine output torque) will be controlled so that the detected transmission output shaft torque becomes optimum. Therefore, in this control, the engagement transition oil pressure and the engine output torque are employed as control quantities. With the engagement transition oil pressure the turbine rotational speed is controlled and with the engine output torque the transmission output shaft torque is controlled.

For example, in the case where the transmission output shaft torque is greater than its target value and the turbine rotational speed is less than its target value, the output torque of the engine is controlled in a falling direction in order to lower the transmission output shaft torque, whereas the engagement transition oil pressure is controlled in a falling direction in order to raise the turbine rotational speed. For this reason, the transmission output shaft torque falls too far from the target value and the turbine rotational speed does not rise up to the target value. Finally, two control values, the engagement transition oil pressure and the engine output torque, interfere with each other, and consequently, the control of a case having two target values is not sufficiently achieved.

SUMMARY OF THE INVENTION

It is an object of the present invention to provide a control apparatus for an automatic transmission which sets the target values of what is changed by a speed-change (for example, turbine rotational speed during a speed change) and a parameter whose value changes in parallel to a speed changing operation (for example, transmission output shaft torque) and which prevents the interference of the target values and thereby can reliably perform the compatibility of a reduction in the speed-changing shock and an enhancement in the durability of friction engaging elements.

To achieve this end, there is provided a control apparatus for an automatic transmission, comprising: oil pressure control means for controlling engagement transition oil pressure which is supplied to friction engaging elements so that what is changed by a speed-change is changed along a locus of a predetermined target value; engine torque control means for controlling a quantity of change in engine output torque during a speed-change so that a parameter whose value changes in parallel to a speed changing operation has an optimum change characteristic; oil pressure correction means for correcting the engagement transition oil pressure, based on the quantity of change in the engine output torque, in controlling the engagement transition oil pressure; and engine torque correction means for correcting the quantity of change in the engine output torque, based on the engagement transition oil pressure, in controlling the quantity of change in the engine output torque.

The target values of what is changed by a speed-change (e.g., turbine rotational speed during a speed-change) and a parameter whose value changes in parallel to a speed changing operation (e.g., transmission output shaft torque) are optimally set and also the interference between the control quantities can be prevented, and consequently, the compatibility of a reduction in the speed-changing shock and an enhancement in the durability of friction engaging elements can be reliably performed.

In a preferred form of the present invention, what is changed by a speed-change is the turbine rotational speed of a torque converter in the automatic transmission. The oil pressure control means sets a target value so that the turbine rotational speed during a speed-change is changed with a predetermined rotation change rate, in order to end a speed-change in a predetermined time, and controls the engagement transition oil pressure which is supplied to the friction engaging elements so that the turbine rotational speed changes along the target value. Therefore, the engagement transition pressure on the friction engaging elements are easily controlled in correspondence with the turbine rotational speed easy to control, and the aforementioned advantages are obtainable.

The parameter whose value changes in parallel to a speed changing operation is torque of an output shaft in the automatic transmission. The engine torque control means sets a target value so that the output shaft torque is smoothly shifted from the current speed-change stage to the next speed-change stage, and controls the quantity of change in the engine output torque so as to change along the target value. Therefore, the transmission output shaft torque is easily controlled by the output torque of the engine easy to control, and the aforementioned advantages are obtainable.

In another preferred form of the present invention, the control of the engagement transition oil pressure and the control of the quantity of change in the engine output torque include at least either one or the other of feedforward control and feedback control. With this, high precision speed-changing control can be performed.

The quantity of change in the engine output torque may be at least one of among a quantity of change in engine ignition timing, a quantity of change in fuel injection, a quantity of change in engine valve timing, and a quantity of change in engine suction air. With this, the engine output torque is changed easily and accurately, and the transmission output shaft torque can be controlled.

In still another preferred form of the present invention, when a period is ended which controls the engagement transition oil pressure which is supplied to friction engaging elements so that what is changed by a speed-change is changed along a locus of a predetermined target value and when a period is ended which controls the quantity of change in the engine output torque during a speed-change so that a parameter whose value changes in parallel to a speed changing operation has an optimum change characteristic, the engagement transition pressure is reduced in order to suppress an increase in the output torque which is caused by an end of a torque reducing operation. Thereafter, the engagement transition oil pressure is increased with certain inclination. As a result, the engagement between the friction engaging elements can be smoothly performed when the speed changing operation is ended, and a reduction in the speed-changing shock and an enhancement in the durability of friction engaging elements can be more reliably performed.

In a further preferred form of the present invention, deviation between the last control value and the current control value is learned and the learned deviation is used as a learned value for the next speed-change. With learning correction, high precision speed-changing control can be performed.

The output torque of the automatic transmission that is increased during a speed-change may be predicted. The predicted output torque is set as a target value for output torque. Therefore, fine speed changing can be performed in correspondence with an increase in the transmission output shaft torque, and a reduction in the speed-changing shock and an enhancement in the durability of friction engaging elements can be more reliably performed.

The above and other objects and advantages of the present invention will become apparent from the following detailed description when read in conjunction with the accompanying drawings

BRIEF DESCRIPTION OF THE DRAWINGS

FIG. 2 is a block diagram showing a feedforward controller;

FIG. 10 is a block diagram showing how target rotational speed is computed;

FIG. 11 is a block diagram showing how target output torque is set;

FIG. 12 is a block diagram showing how initial pressure is set;

FIG. 14 is a timing diagram showing how speed changing is controlled.

DETAILED DESCRIPTION OF THE PREFERRED EMBODIMENT

An embodiment of the present invention will hereinafter be described in reference to the drawings.

Initially, a description will be made of the control system of the present invention.

(I) Control system of the present invention

Figure 1:
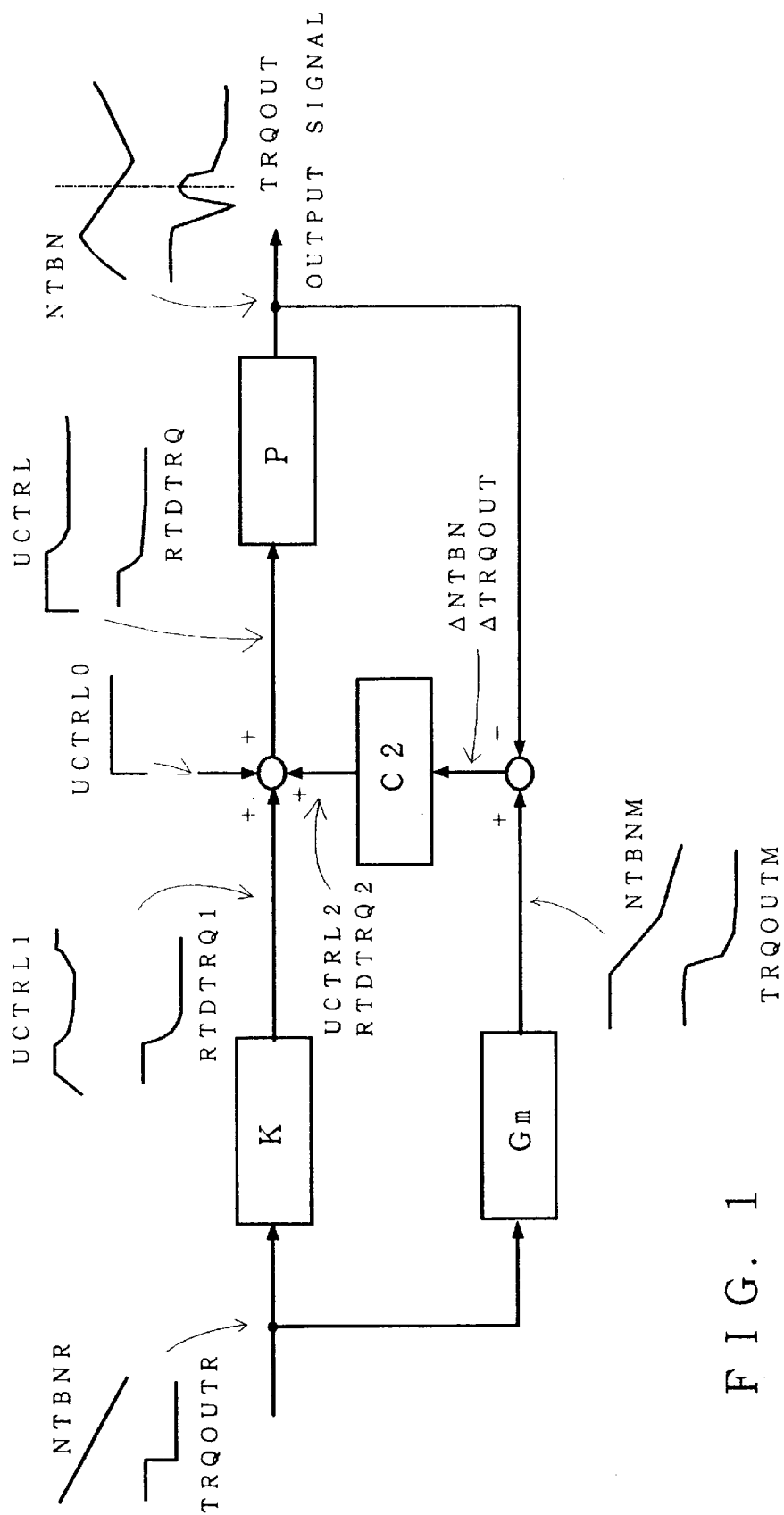
FIG. 1 is a block diagram for explaining the control system of the present invention.

FIG. 1 is a system block diagram for explaining the control system of the present invention. In the figure, the present invention sets two target values: for example, what is changed by a speed-change (e.g., turbine rotational speed NTBN of an automatic transmission) and a parameter whose value changes in parallel to a speed changing operation (e.g., output shaft torque TRQOUT of an automatic transmission). Target turbine rotational speed NTBNR and target transmission output shaft torque TRQOUTR are input to a feedforward controller (K) and also are input to a prescriptive model (Gm). Note that the target turbine rotational speed NTBNR and the target transmission output shaft torque TRQOUTR are determined by the traveling conditions of a vehicle.

The feedforward controller (K) performs feedforward control on the turbine rotational speed and the transmission output shaft torque in correspondence with the target values and outputs feedforward signals UCTRL1 and RTDTRQ1. On the other hand, the prescriptive model (Gm) sets and outputs model turbine rotational speed NTBNM in correspondence with the target turbine rotational speed NTBNR so that the inclination of the turbine rotational speed is made constant, in order to end a speed-change in a predetermined time. Also, the prescriptive model (Gm) sets and outputs a model transmission output shaft torque TRQOUTM in correspondence with the target transmission output shaft torque TRQOUTR in order to smoothly transfer transmission output shaft torque to a speed-change stage (for example, first-speed torque to second-speed torque) when speed is changed.

The turbine rotational speed NTBN and the transmission output shaft torque TRQOUT are detected as the output signals of the automatic transmission (P) which is a control object. The deviation between the turbine rotational speed NTBN and the model turbine rotational speed NTBNM and the deviation between the transmission output shaft torque TRQOUT and the model transmission output shaft torque TRQOUTM are computed by an operator and are input to a feedback controller (C2). Note that the deviation between the turbine rotational speed NTBN and the model turbine rotational speed NTBNM is computed as $\Delta$NTBN, and that the deviation between the transmission output shaft torque TRQOUT and the model transmission output shaft torque TRQOUTM is computed as $\Delta$TRQOUT.

The speed deviation $\Delta$NTBN and the torque deviation $\Delta$TRQOUT are input to the feedback controller (C2), which in turn outputs feedback signals UCTRL2 and RTDTRQ2 so that the turbine rotational speed NTBN and the transmission output shaft torque TRQOUT consist with the model turbine rotational speed NTBNM and the model transmission output shaft torque TRQOUTM, respectively.

Thereafter, the output signals of the feedforward controller (K), the output signals of the feedback controller (C2), and a sequence signal UCTRL0 are added to generate transmission control signals UCTRL and RTDTRQ. The automatic transmission (P) is controlled by the control signals UCTRL and RTDTRQ. Note that the sequence signal UCTRL0 is a signal for giving the automatic transmission (P) a predetermined oil pressure when speed changing is started.

In the control of the automatic transmission (P) that is performed by the aforementioned system, the feedforward controller (K) is designed so that two control quantities relative to the turbine rotational speed and the transmission output shaft torque (i.e., engagement transition oil pressure on friction engaging elements, and engine output torque) do not interfere with each other. Similarly, the feedback controller (C2) is designed so that the output signals UCTRL2 and RTDTRQ2 thereof do not interfere with each other. Also, the prescriptive model (Gm) sets the optimum values of two control quantities relative to the turbine rotational speed and the transmission output shaft torque from the two viewpoints of a reduction in speed-changing shock and an enhancement in the durability of friction engaging elements. With this, the target values of what is changed by a speed-change (e.g., turbine rotational speed during a speed-change) and a parameter whose value changes in parallel to a speed changing operation (e.g., transmission output shaft torque) are optimally set. Also, the interference between the two control quantities is prevented, and the compatibility of a reduction in the speed-changing shock and an enhancement in the durability of friction engaging elements is reliably performed.

(i) Design of the feedforward controller (K)

Now, a description will be made of the specific design of the feedforward controller (K) in reference to FIG. 2.

In the figure the feedforward controller (K) has four arithmetic blocks and is designed to include non-interference blocks K12 and K21 among them. The control quantities of turbine rotational speed and transmission output shaft torque are parameters that can interfere with each other. The feedforward controller (K), therefore, needs to be designed so that two output values UCTRL1 and RTDTORQ1 relative to two target values (i.e., target turbine rotational speed NTBNR and target transmission output shaft torque TRQOUTR) do not interfere with each other. For this reason, the feedforward controller (K), including non-interference blocks K12 and K21, is designed as follows:

First, let the feedforward controller (K) be expressed by the following Eq. (1).

$$K = P_0^{-1} G_m \quad (P_0: \text{nominal model}) \quad (1)$$

Therefore, the turbine rotational speed NTBN and the transmission output shaft torque TRQOUT are expressed by the following Eq. (2) with respect to the target turbine rotational speed NTBNR and the target transmission output shaft torque TRQOUTR.

$$\begin{bmatrix} NTBN \\ TRQOUT \end{bmatrix} = \begin{bmatrix} P_0 P_0^{-1} Gm \end{bmatrix} \begin{bmatrix} NTBNR \\ TRQOUTR \end{bmatrix} \quad (2)$$

$$= \begin{bmatrix} Gm \end{bmatrix} \begin{bmatrix} NTBNR \\ TRQOUTR \end{bmatrix}$$

If the Gm in Eq. (2) is expressed by a diagonal matrix, the following Eq. (3) will be obtained.

$$Gm = \begin{bmatrix} Gm11 & 0 \\ 0 & Gm22 \end{bmatrix} \quad (3)$$

Therefore, the turbine rotational speed NTBN and the transmission output shaft torque TRQOUT become as follows:

$$NTBN = Gm11 \times NTBNR \quad (4)$$

$$TRQOUT = Gm22 \times TRQOUTR \quad (5)$$

From Eqs. (4) and (5) the target values (NTBNR and TRQOUTR) will not interfere with each other. Therefore, it will be sufficient if the feedforward controller (K) is made as shown in the following Eq. (6).

$$K = \begin{bmatrix} K11 & K12 \\ K21 & K22 \end{bmatrix} \quad (6)$$

$$= \begin{bmatrix} P11 & P12 \\ P21 & P22 \end{bmatrix}^{-1} \begin{bmatrix} Gm11 & 0 \\ 0 & Gm22 \end{bmatrix}$$

(ii) Design of the feedback controller (C2)

Figure 3:
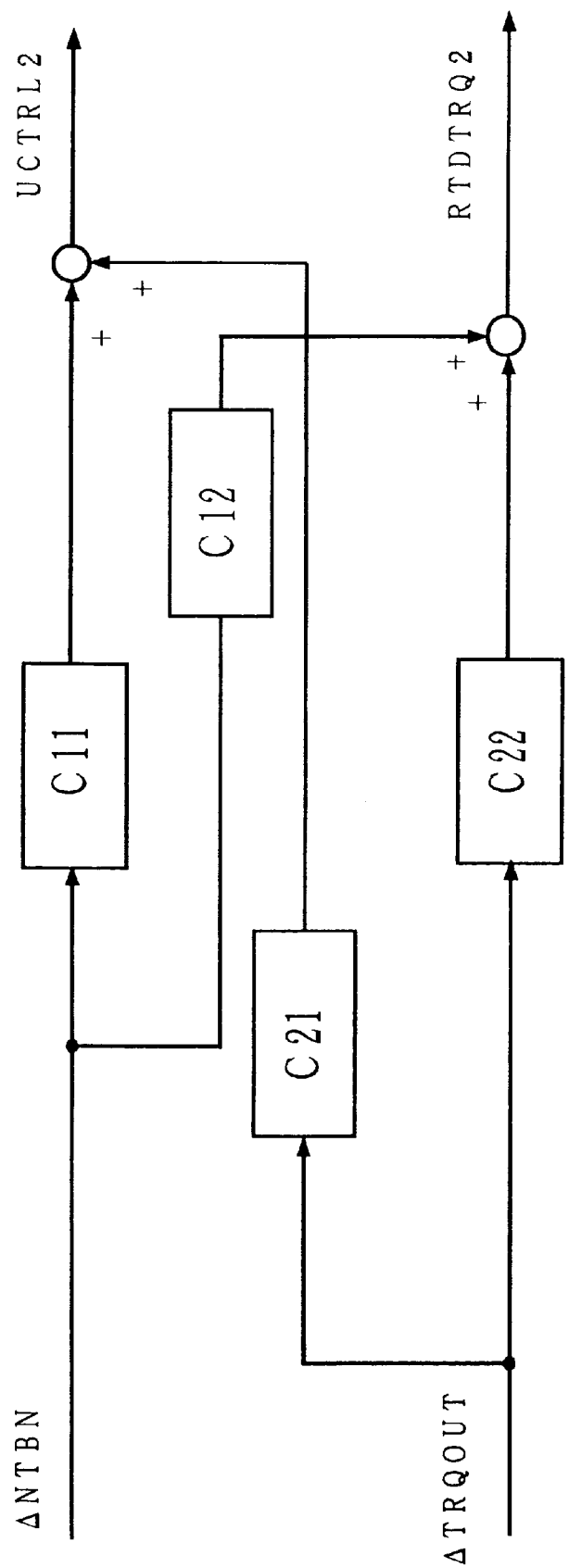
FIG. 3 is a block diagram showing a feedback controller.

Now, a description will be made of the specific design of the feedforward controller (K) in reference to FIG. 3.

In the figure the feedback controller (C2) has four arithmetic blocks and is designed to include non-interference blocks C12 and C21 among them. That is, the feedback controller (C2), as with the feedforward controller (K), is designed so that the output values UCTRL2 and RTD-TORQ2 of the feedback controller (C2) do not interfere with each other.

Initially, let the feedback controller (C2) be expressed by the following Eqs. (7) and (8).

$$C2 = Q(1 - P_0 Q)^{-1} \quad (P_0: \text{nominal model}) \quad (7)$$

$$Q = W_q P_0^{-1} \quad (8)$$

Therefore, the closed loop transfer function from the prescriptive model signal to the output signal is expressed by the following Eq. (9).

$$\begin{bmatrix} NTBN \\ TRQOUT \end{bmatrix} = \begin{bmatrix} P_0 C2 (1 + P_0 C2)^{-1} \end{bmatrix} \begin{bmatrix} NTBNM \\ TRQOUTM \end{bmatrix} \quad (9)$$

$$= \begin{bmatrix} Wq \end{bmatrix} \begin{bmatrix} NTBNM \\ TRQOUTM \end{bmatrix}$$

If the Wq in Eq. (9) is expressed by a diagonal matrix, the following Eq. (10) will be obtained.

$$Wq = \begin{bmatrix} Wq11 & 0 \\ 0 & Wq22 \end{bmatrix} \quad (10)$$

Therefore, the turbine rotational speed NTBN and the transmission output shaft torque TRQOUT become as follows:

$$NTBN = Gq11 \times NTBNM \quad (11)$$

$$TRQOUT = Gq22 \times TRQOUTM \quad (12)$$

From Eqs. (11) and (12) the model turbine rotational speed NTBNM and the model transmission output shaft torque TRQOUTM of the prescriptive mode will not interfere with each other.

Therefore, it will be sufficient if the feedback controller (C2) is made as shown in the following Eq. (13).

$$C2 = \begin{bmatrix} C11 & C12 \\ C21 & C22 \end{bmatrix} \quad (13)$$

$$= \begin{bmatrix} \dfrac{wq11}{1-wq11} & 0 \\ 0 & \dfrac{Wq22}{1-Wq22} \end{bmatrix} \begin{bmatrix} P11 & P12 \\ P21 & P22 \end{bmatrix}^{-1}$$

(iii) Example of the prescriptive model Gm

Figure 4:
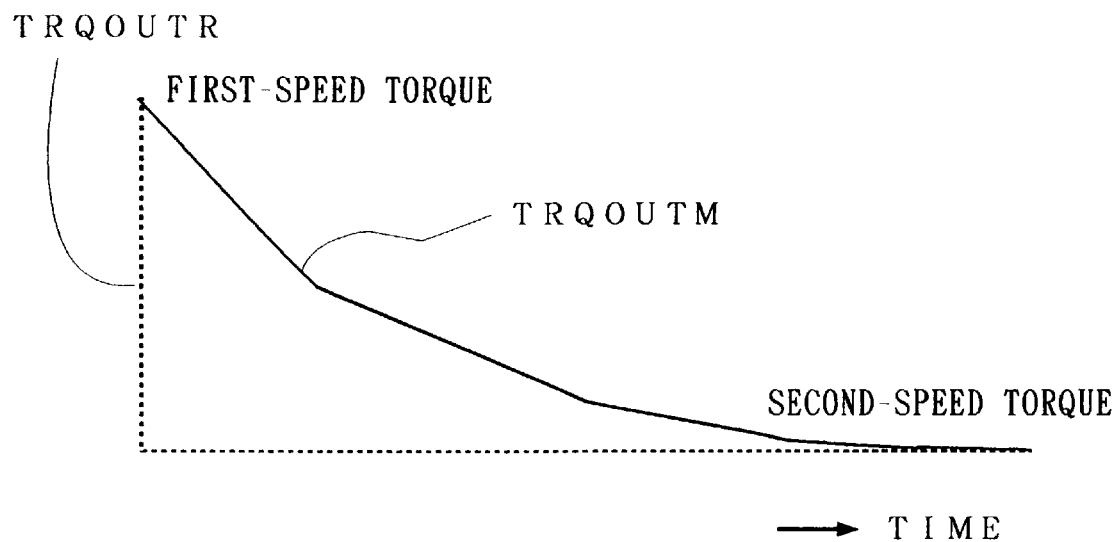
FIG. 4 is a diagram showing the torque output characteristics of a prescriptive model.

Now, a description will be made of an example of the prescriptive model Gm in reference to FIGS. 4 and 5.

The prescriptive mode Gm has two outputs: turbine rotational speed and transmission output shaft torque. Since the speed changing performance of an automatic transmission is characterized by the two outputs, how the prescriptive model Gm is designed is important. In this case, since the prescriptive model Gm can be arbitrary designed if limits on control are removed, the speed changing performance of an automatic transmission can be positively controlled. The prescriptive model Gm is expressed by a transfer function matrix, as shown in the aforementioned Eq. (3). First, the output torque TRQOUTM of the prescriptive model is designed along a curve such as that shown in FIG. 4 with respect to the target torque TRQOUTR, in order to smoothly transfer transmission output shaft torque to a speed-change stage (for example, from first-speed torque to second-speed torque) when speed is changed. Now, if an operator S for expressing a transfer function is employed, the aforementioned Gm22 will correspond to a quadratic curve such as that expressed in the following Eq. (14).

$$Gm22 = BM2/(S^2 + AM2 \cdot S + BM2) \quad (14)$$

where AM2 and BM2 are coefficients.

Figure 5:
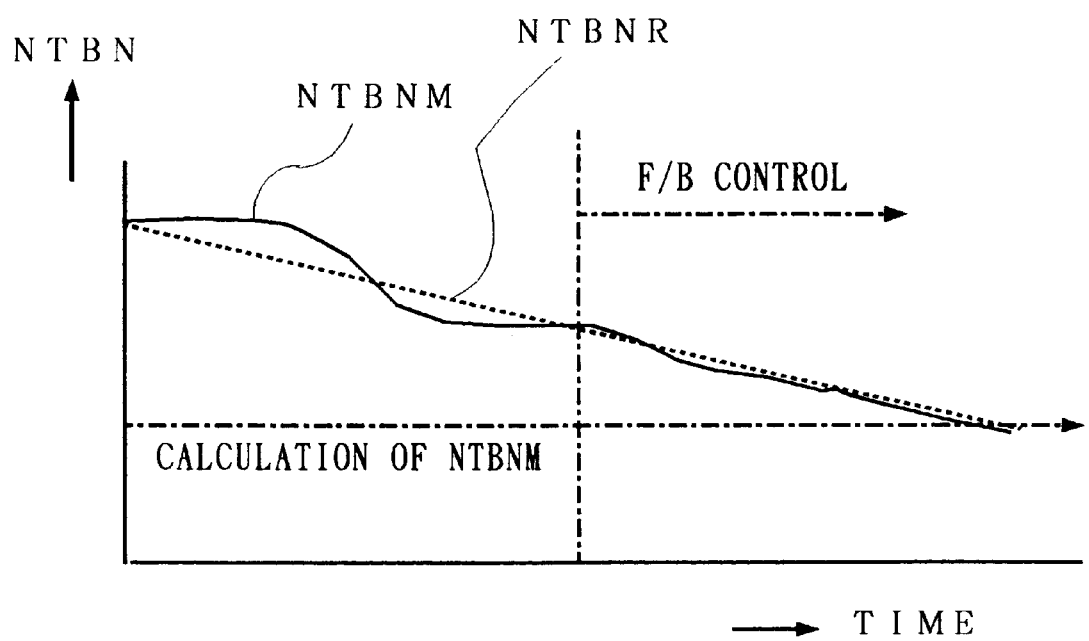
FIG. 5 is a diagram showing the turbine rotational speed characteristics of a prescriptive model.

Also, in order to end the speed changing of an automatic transmission in a predetermined time, the target value NTBNR of the turbine rotational speed is given so that the inclination of the turbine rotational speed during a speed-change is made constant, and the turbine rotational speed NTBNM of the prescriptive model is designed along a curve such as that shown in FIG. 5 so that the model turbine rotational speed NTBNM follows the turbine rotational speed target value NTBNR. Now, if an operator S for expressing a transfer function is employed, the aforementioned Gm11 will correspond to a quartic curve such as that expressed in the following Eq. (15).

$$Gm11=(CM1\cdot S+DM1)/(S^4+AM1\cdot S^3+BM1\cdot S^2+CM1\cdot S+DM1) \quad (15)$$

where AM1, BM1, CM1, and DM1 are coefficients.

Note that since the turbine rotational speed NTBNM of the prescriptive model has a nature to overshoot, the timing at which computation is started is made earlier so that the turbine rotational speed NTBNM of the prescriptive model is converged before the start point of feedback control, thereby giving time enough to eliminate the influence of the nature to overshoot.

(II) Embodiment of the present invention

An embodiment of the present invention will hereinafter be described in detail in reference to the drawings.

(A) Entire control structure

Figure 6:
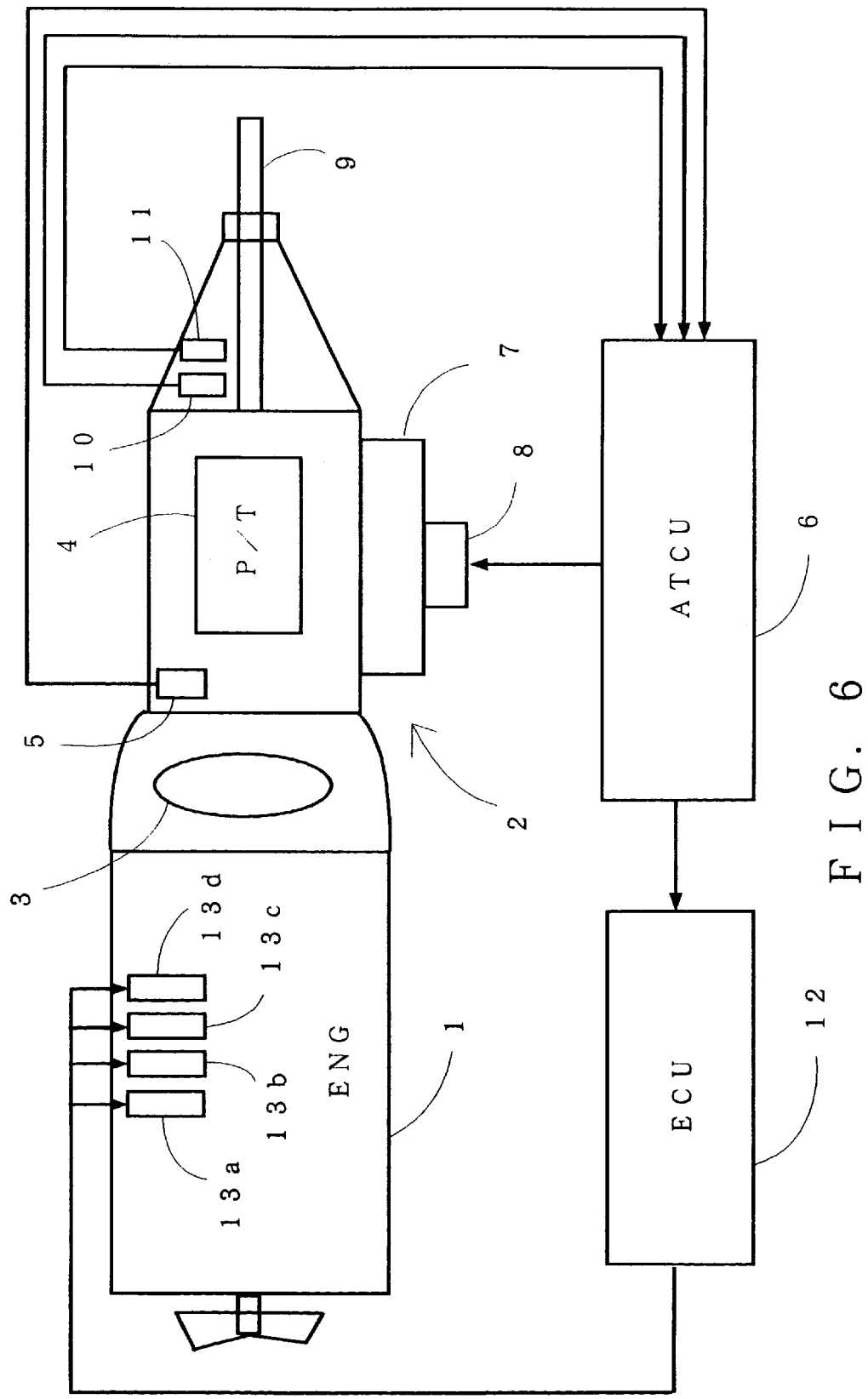
FIG. 6 is a block diagram showing a control apparatus for automatic transmissions of an embodiment of the present invention which is applied to vehicles.

FIG. 6 is a block diagram showing a control apparatus for an automatic transmission of an embodiment of the present invention which is applied to vehicles. In the figure, reference numeral 1 denotes an engine. The driving force of the engine 1 is transferred to the torque converter 3 of an automatic transmission 2, and the power train 4 of the automatic transmission 2 is driven via the torque converter 3. The torque converter 3 is constituted by a pump impeller, a turbine runner, a stator, and a one-way clutch supporting the stator. The torque converter 3 amplifies rotation of the crankshaft of the engine 1 in a predetermined converter range and transmits the rotation to an input shaft of the power train 4 serving as the auxiliary transmission of the automatic transmission 2 (second half stage of the transmission mechanism). Because the torque converter 3 is well known in the prior art, an illustration thereof and a further detailed description will not be given here.

The rotational speed of the turbine runner in the torque converter 3 is detected by a turbine rotation sensor 5 and is input to a speed-changing control unit 6. The automatic transmission 2 has an oil-pressure controller 7 for controlling oil pressure and an oil-pressure solenoid 8 in addition to the aforementioned power train 4 (auxiliary transmission). The automatic transmission outputs rotation of the transmission input shaft from an output shaft 9, by switching the operating positions of a plurality of friction engaging elements disposed in the power train 4 to perform speed changing control by stages.

The rotational force of the output shaft 9 is transmitted to rear wheels via differential gears, and the vehicle is driven. The rotational speed of the output shaft 9 (corresponding to the speed of the vehicle) is detected by a vehicle speed rotation sensor 10 and is input to the speed-changing control unit 6. The output shaft torque of the output shaft 9 is detected by an output-torque sensor 11 and is input to the speed-changing control unit 6.

The speed-changing control unit 6 is constituted by a microcomputer, and performs arithmetic processing required for the speed-changing control of the automatic transmission 2, based on signals from the turbine rotation sensor 5, vehicle speed rotation sensor 10, and output-torque sensor 11, and then outputs a control signal to the oil-pressure solenoid 8. The oil-pressure solenoid 8 controls the oil pressure in the oil-pressure controller 7 to switch the operating positions of the friction engaging elements disposed in the power train 4 by oil pressure, thereby performing the speed-changing control of the automatic transmission 2 by stages. The arithmetic processing of the speed-changing control in the speed-changing control unit 6 is executed by a control program to be described later.

When speed-changing control is performed, a torque reduction instruction is output from the speed-changing control unit 6 to the engine control unit 12. The engine control unit 12 includes a microcomputer, which controls the combustion control of the engine 1, based on sensor outputs such as air-fuel sensor, throttle opening degree sensor, and intake air quantity sensor outputs (not shown), and also controls ignition timings of ignition plugs 13a through 13d to reduce engine torque, based on an instruction from the speed-changing control unit 6. Note that a control parameter to reduce engine torque is not limited to ignition timing but the engine torque may be controlled by changing other parameters (for example, a throttle opening degree, a fuel injection quantity, engine valve timing, and a quantity of change of engine suction air.). In short, any parameter will do, so long as it can reduce engine torque.

The speed-changing control unit 6, oil-pressure control unit 7, and oil-pressure solenoid 8 constitute oil-pressure control means and oil-pressure correction means. Also, the change speed control unit 6 and the engine control unit 12 constitute engine-torque control means and engine-torque correction means.

In this embodiment of the present invention, what is changed by a speed-change is the turbine rotational speed of the automatic transmission 2, and a parameter whose value changes in parallel to a speed changing operation is the output shaft torque in the automatic transmission 2. Note that a member which changes by a speed-change is not limited to the turbine shaft of the automatic transmission 2 but may be the clutches and brake of the automatic transmission. Also, for a target value, anything will do, so long as it changes by a speed-change. For example, it may be a rate of change in the turbine rotational speed or gear ratio, or a rate of change in the engine speed.

(B) Speed changing operation

Now, a description will be made of a speed changing operation that is performed upon execution of a speed-changing control program.

Figure 7:
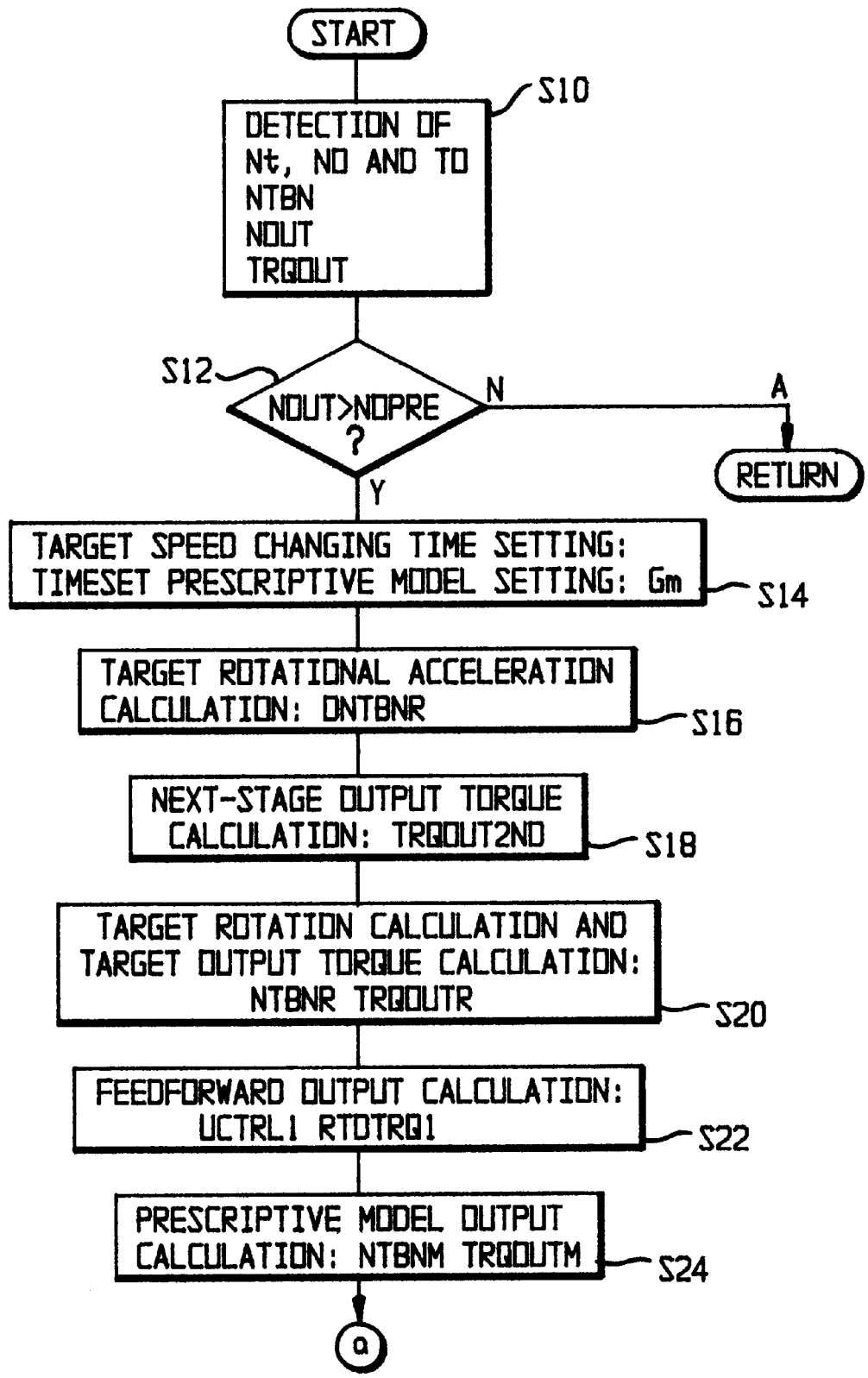
FIG. 7 is a flowchart showing a speed-changing control program.
Figure 8:
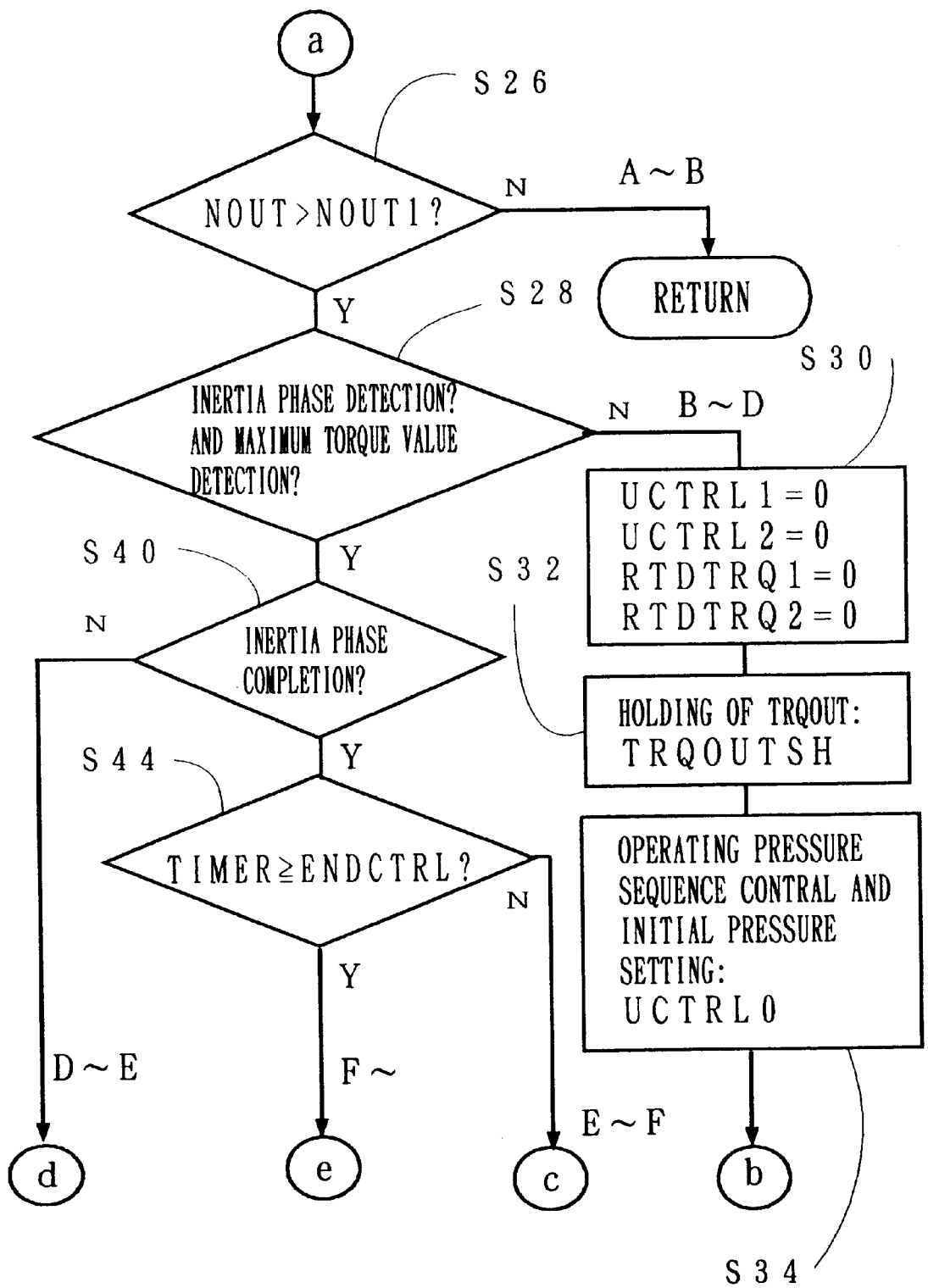
FIG. 8 is a flowchart showing the speed-changing control program.
Figure 9:
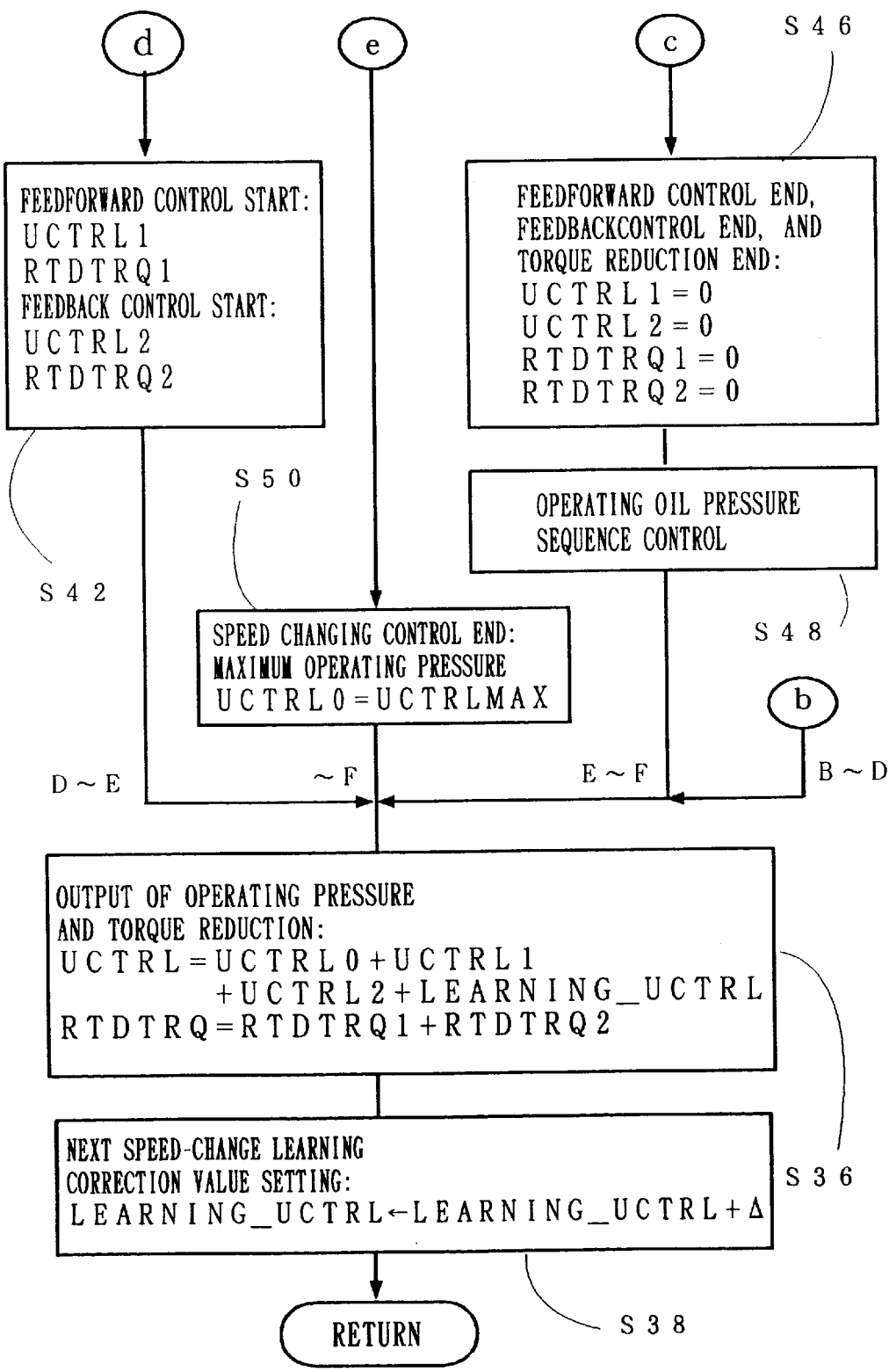
FIG. 9 is a flowchart showing the speed-changing control program.

FIGS. 7 through 9 are flowcharts showing the speed-changing control program. This program is repeatedly executed, for example, once for every predetermined time (for example, 10 ms).

Figure 15:
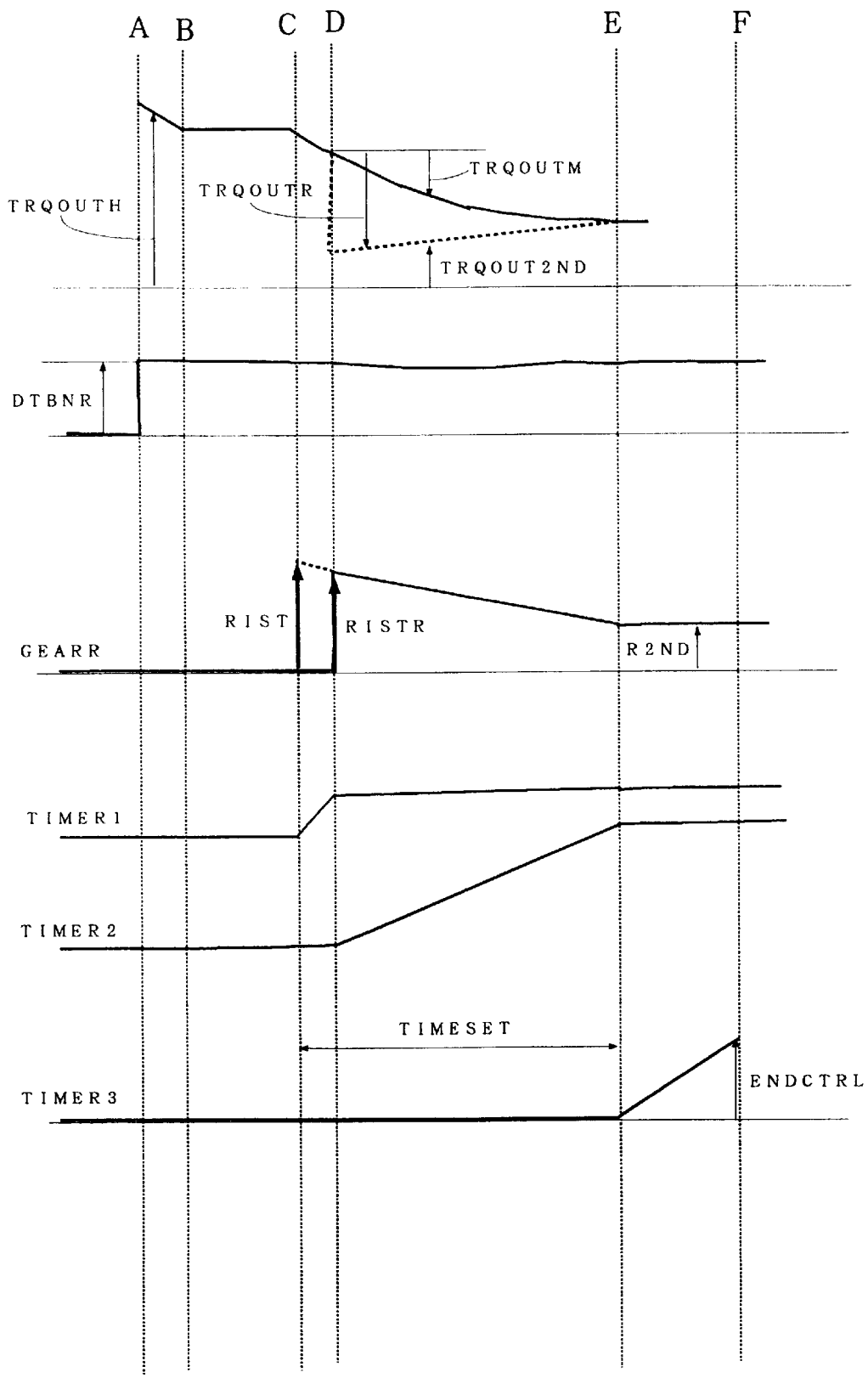
FIG. 15 is a timing diagram showing how speed changing is controlled.

FIGS. 10 through 13 are block diagrams showing how a predetermined variable is computed in the process of the speed-changing control program, and FIGS. 14 and 15 are timing diagrams showing how speed changing is controlled.

In the processing description of each step of the speed-changing control program, a description will be made of a speed changing operation while referring to the speed-changing control timing diagrams shown in FIGS. 14 and 15. Before describing the speed-changing control program, a description will be made of the speed-changing control timing A through F shown in FIGS. 14 and 15.

Timing A is the timing at which a computation for speed-changing control is started before start of a speed-change, and corresponds to a speed-changing preparation point.

Timing B is speed-changing start timing, and corresponds to a speed-changing start point at the time the output speed NOUT of the transmission output shaft 9 has exceeded speed-changing start output speed NOUT1.

Timing C is the timing at which torque phase ends after start of a speed-change, and corresponds to an inertia phase start point.

Timing D is the timing at which torque phase ends after start of a speed-change and shifts into inertia phase and then the maximum value TRQOUTMAX of the output torque TRQOUT occurs, and corresponds to a torque reduction start point.*

Timing E is the timing at which inertia phase ends during a speed-change, and is the end point of feedforward control and feedback control and also is the end point of torque reduction.

Timing F is the timing at which a speed-change ends (speed-changing control end point).

Processing loop (1); period before speed-changing preparation timing A:

If the speed-changing control program is started, in step S10 the turbine rotational speed Nt, vehicle speed No, and output shaft torque To of the automatic transmission 2 will be detected based on signals from the turbine rotation sensor 5, vehicle speed rotation sensor 10, and output-torque sensor 11. As the respective detected values, turbine rotational speed NTBN, output rotational speed NOUT, and output torque TRQOUT are obtained. Next, in step S12 it is judged whether nor not the output rotational speed NOUT has exceeded a predetermined speed-changing preparation rotational speed NOPRE. The speed-changing preparation rotational speed NOPRE is set to a slightly lower value than speed-changing start output rotational speed NOUT1 and is a reference value for starting computation for a speed-change at the time the output rotational speed NOUT has exceeded the speed-changing preparation rotational speed NOPRE.

If the output rotational speed NOUT has not exceeded the speed-changing preparation rotational speed NOPRE, step S12 will return to step S10, and a loop of step S10 step 12, and RETURN step will be repeated again.

Processing loop (2); period from speed-changing preparation timing A prior to speed-changing timing B:

If the output rotational speed NOUT exceeds the speed-changing preparation rotational speed NOPRE, step S12 will advance to step S14. In step S14, target speed-changing time TIMESET is set. The target speed-changing time TIMESET is a desirable speed-changing time and is set to the most desirable value in consideration of speed-changing shock and durability in friction engaging elements. For example, the target changing-speed time TIMESET is set to a desirable value of previously mapped or tabled values, depending upon the kind of speed-change. Note that the target speed-changing time TIMESET corresponds to the period of the inertia phase until speed-changing control end, excluding the torque phase which is obtained when a speed-change is started.

In step S14, prescriptive model Gm is set. The prescriptive model Gm, as with the target changing-speed time TIMESET, is set to a desirable one of previously mapped or tabled values, depending upon the kind of speed-change.

Next, in step S16 target rotational acceleration DNTBNR is computed. Prior to the computation of the target rotational acceleration DNTBNR, engine torque TRQENG and reference output torque TRQOUTB are computed by the following Eqs. (16) and (17) from the current output torque TRQOUT.

$$TRQENG = K5 \times TRQOUT \tag{16}$$

From Eq. (16) the engine torque TRQENG is computed by multiplying the current output torque TRQOUT by a predetermined torque ratio (coefficient) K5. This means that the engine torque TRQENG is estimated from the current output torque TRQOUT.

$$TRQOUTB = K8 \times TRQENG \tag{17}$$

From Eq. (17) the reference output torque TRQOUTB is computed by multiplying the computed engine torque TRQENG by a predetermined torque ratio K8. Note that the reference output torque TRQOUTB is the output torque that is obtained at the time the turbine rotational acceleration has become 0.

The target rotational acceleration DNTBNR is computed based on the following Eq. (18), using the reference output torque TRQOUTB.

$$DNTBNR = [(R2ND - R1ST)/(TIMESET)] \times NOUT + (R2ND/I2) \times TRQOUTB \tag{18}$$

where R1ST is the first-speed gear ratio, R2ND is the second-speed gear ratio, NOUT is the output rotational speed, TRQOUTB is the reference output torque, TIMESET is the target speed-changing time, and I2 is a coefficient.

Next, in step S18 next-stage output torque TRQOUT2ND (which is obtained when a speed-change is ended) is computed based on the following Eq. (19). Since a description is being made of the case where speed is shifted from first speed to second speed, the next stage will be second speed.

$$TRQOUT2ND = K6 \times K7 \times TRQENG \tag{19}$$

From Eq. (19) the output torque TRQOUT2ND at the time of the end of a speed-change (i.e., next-stage output torque) is computed by multiplying the aforementioned engine torque TRQENG by predetermined torque ratios K6 and K7.

In step S20, target rotational speed NTBNR and target output torque TRQOUTR are calculated. The target rotational speed NTBNR is computed according to the process shown in a block diagram of variable number derivation of FIG. 10. In the figure, target rotational acceleration DNTBNR is first integrated (1/S), thereby obtaining torque phase. Also, a target gear ratio GEARR is computed based on the following Eq. (20) from the target speed-changing time TIMESET corresponding to the period of inertia phase until the end of a speed-change.

$$GEARR = \{[(R2ND - R1ST)/(TIMESET - TIMER1)] \times TIMER2\} + R1STR \tag{20}$$

The computed target gear ratio GEARR and the output rotational speed NOUT are added together, thereby obtaining inertia phase. From the previously computed torque phase and inertia phase, target rotational speed NTBNR is computed. With this, the target rotation speed NTBNR is expressed by the following Eq. (21).

$$NTBNR = DNTBNR \times dt \tag{21}$$

The target output torque TRQOUTR is computed according to the process shown in a block diagram of variable number derivation of FIG. 11. In the figure, the output torque TRQOUTH in the inertia torque is first estimated based on the following Eq. (22).

$$TRQOUTH = TRQOUTB + (K9 \times DNTBNR) \tag{22}$$

where K9 is a torque ratio.

On the other hand, the current output torque TRQOUT is obtained by computing engine torque TRQENG0 from the target rotational acceleration DNTBNR and a torque reduction instruction value RTDTRQ and then estimating second-speed output torque TRQOUT2ND, based on the computed engine torque TRQENG0. Then, target output torque TRQOUTR is computed from the output torque TRQOUTH and the second-speed output torque TRQOUT2ND during inertia phase.

In step S22 the output values UCTRL1 and RTDRQ1 of feedforward control are computed and set. The output values UCTRL1 and RTDRQ1 of feedforward control are computed by the following Eq. (23), based on the target rotational speed NTBNR and target output torque TRQOUTR.

$$\begin{bmatrix} UCTRL1 \\ RTDTRQ1 \end{bmatrix} = \begin{bmatrix} K \end{bmatrix} \begin{bmatrix} NTBNR \\ TRQOUTR \end{bmatrix} \quad (23)$$

In this case the output value UCTRL1 of feedforward control, for example, becomes UCTRL1=K11×NTBNR.

In step S24 the output values NTBNM and TRQOUTM of the prescriptive model are computed and set. The output values NTBNM and TRQOUTM of the prescriptive model are computed by the following Eq. (24), based on the target rotational speed NTBNR and target output torque TRQOUTR.

$$\begin{bmatrix} NTBNR \\ TRQOUTM \end{bmatrix} = \begin{bmatrix} Gm \end{bmatrix} \begin{bmatrix} NTBNR \\ TRQOUTR \end{bmatrix} \quad (24)$$

In this case the output value NTBNM of the prescriptive model, for example, becomes NTBNM=Gm11×NTBNR. In order not to make speed-changing shock worse, it is necessary to converge the rotation of the prescriptive mode to target rotation by timing D.

In step S26 it is judged whether or not the output rotational speed NOUT has exceeded a predetermined speed-changing start rotational speed NOUT1 (a speed-changing start point). The speed-changing start rotational speed NOUT1 is a reference point for judging whether a speed-change is started, and a speed-change is started at the time the output rotational speed NOUT has exceeded the speed-changing start rotational speed NOUT1. If the output rotational speed NOUT has not exceeded the speed-changing start rotational speed NOUT1, step S26 will return to step S10, and a loop of steps S10 through S26 and RETURN step will be repeated again.

As previously described, if the output rotational speed NOUT exceeds the speed-changing preparation rotational speed NOPRE, computation for speed changing control will be started at timing A before a speed-change is started. That is, the setting of target speed-changing time TIMESET, setting of prescriptive model Gm, calculation of target rotational acceleration DNTBNR, calculation of next-stage output torque TRQOUT2ND, calculation of target rotational speed NTBNR, calculation of target output torque TRQOUTR, calculation of output values UCTRL1 and RTDTRQ1 of feedforward control, and the calculation of output values NTBNM and TRQOUTM of prescriptive model Gm are performed, thereby performing speed-changing preparation. This loop is repeated until prior to speed changing timing B. After speed changing timing B, the next processing loop (3) will be performed.

Processing loop (3); period from speed-changing start timing B to timing D (torque reduction start point):

If the output rotational speed NOUT exceeds the speed-changing start rotational speed NOUT1, step S26 will advance to step S28 at speed changing timing B. In step S28 it is judged whether or not the inertia phase was detected and also the maximum torque value was detected. This is for the purpose of judging whether the torque phase ends upon start of a speed-change and then the maximum value TRQOUT-MAX of the output torque TRQOUT has appeared. The inertia phase is detected, for example, from a gear ratio or output torque. With this, an inertia phase start point is judged.

In the case where the inertia phase is not detected (e.g. when torque phase does not end), or in the case where the inertia phase is detected but the maximum torque value is not detected, step S28 advances to step S30, in which sequence control is performed. In step S30 the output values UCTRL1 and RTDTRQ 1 of feedforward control and the output values UCTRL2 and RTDTRQ 2 of feedback control are set to 0's, respectively. With this, the feedforward control and feedback control of the turbine rotational speed and output torque will not be performed. Next, in step S32 the current output torque TRQOUT is held at TRQOUTSH, and in step S34 the initial pressure UCTRL0 of oil pressure is set in order to perform operational sequence control.

The initial oil pressure UCTRL0 is calculated according to the process shown in a block diagram of variable number derivation of FIG. 12. In the figure, engine torque TRQENG is first estimated based on the detected output torque value TRQOUT (TRQENG=K5×TRQOUT) and then reference output torque TRQOUTB is calculated (TRQOUTB=K8×TRQENG). Next, target rotational acceleration DNTBNR is calculated according to the aforementioned equation, using the reference output torque TRQOUTB.

Based on the reference output torque TRQOUTB and the target rotational acceleration DNTBNR, output torque height TRQOUTH is computed according to the following Eq. (25).

$$TRQOUTH=TRQOUTB+K6\times DNTBNR \quad (25)$$

where K6 is a torque ratio.

From the output torque height TRQOUTH the torque of the clutch is calculated, and the clutch torque is converted to oil pressure, thereby computing an initial oil pressure instruction value UCTRL0. The initial oil pressure instruction value UCTRL0 is expressed by the following Eq. (26).

$$UCTRL0=(K10\times K1\times TRQOUTH+K11)\times SAFE+LEARNING\_UC\text{-}TRL \quad (26)$$

Thereafter, step S34 advances to step S36, in which operating oil pressure UCTRL and torque reduction output RTDTRQ are output. The operating oil pressure UCTRL and the torque reduction output RTDTRQ are computed by the following Eqs. (27) and (28).

$$UCTRL=UCTRL0+UCTRL1+UCTRL2+LEARNING\_UCTRL \quad (27)$$

$$RTDTRQ=RTDTRQ1+RTDRRQ2 \quad (28)$$

With this, the operating oil pressure UCTRL is output from the speed-changing control unit 6 to the oil pressure solenoid 8. The oil pressure in the oil pressure control unit 7 is controlled, and the operating positions of a plurality of friction engaging elements are switched, so that mechanical speed changing is performed. In addition, the torque reduction output RTDTRQ as a torque reduction instruction is output from the speed-changing control unit 6 to the engine control unit 12 in performing speed changing control, and the ignition timing of the engine 1 is controlled by the engine control unit 12, so that engine torque is reduced. In this loop, sequence control is performed, and since the output values UCTRL1 and RTDTRQ1 of feedforward control and the output values UCTRL2 and RTDTRQ2 of feedback control have all been set to 0, the feedforward control and the feedback control have not been performed.

In step S38 a next speed-change learning correction value LEARNING_UCTRL is set according to the following Eq. (29).

$$LEARNING\_UCTRL = LEARNING\_UCTRL + \Delta \quad (29)$$

Figure 13:
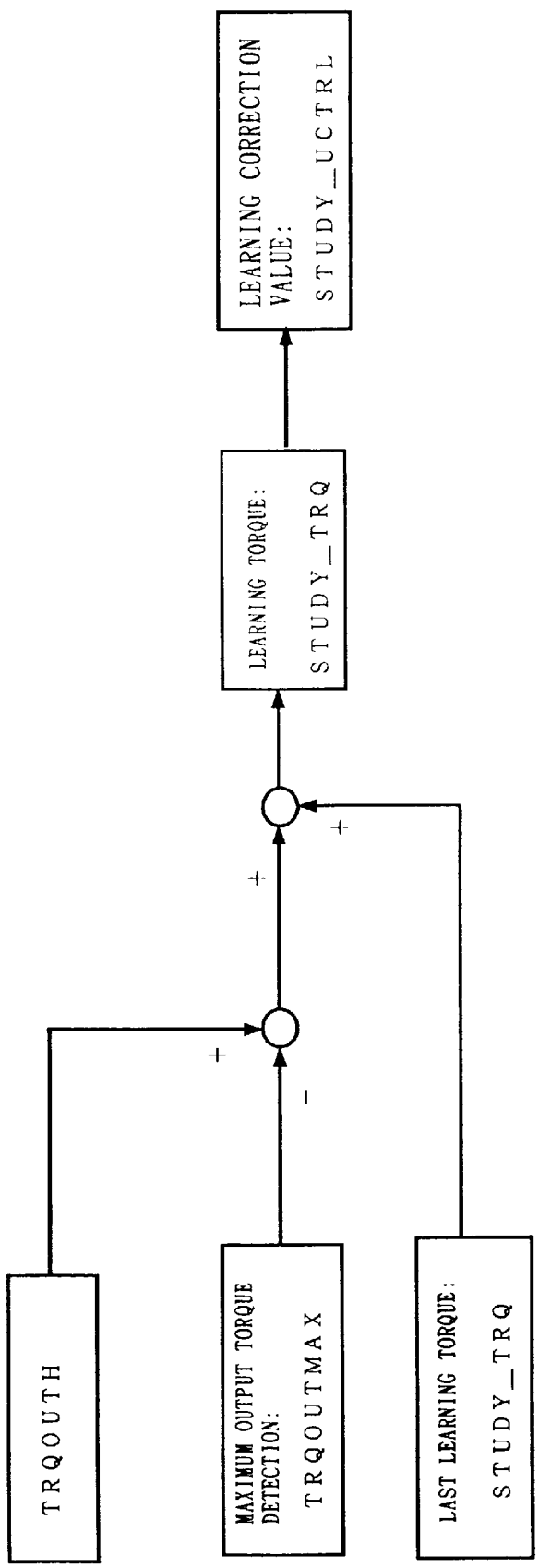
FIG. 13 is a block diagram showing how a learning correction value is computed.

The next speed-change learning correction value LEARNING_UCTRL is calculated according to the process shown in a block diagram of variable number derivation of FIG. 13. In the figure, the deviation between the output torque TRQOUTH and the maximum output torque TRQOUTMAX during the inertia phase (i.e., before-last learning torque LEARNING_TRQ) is computed, and the computed deviation and the last learning torque LEARNING_TRQ are added together, thereby computing the current learning torque LEARNING_TRQ. The computed current learning torque LEARNING_TRQ is added to the current speed-change learning torque LEARNING_UCTRL as Δ (deviation), thereby obtaining the next speed-change learning correction value LEARNING_UCTRL.

In this case the next speed-change learning correction value LEARNING-UCTRL converts the initial deviation LEARNING_TRQ of detected torque as the excess and deficiency of operating oil pressure and employs the initial deviation LEARNING_TRQ as a learned value for the next speed-change. The initial torque deviation LEARNING_TRQ is computed by the following Eq. (30).

$$LEARNING\_TRQ = TRQOUTH - TRQOUTMAX \quad (30)$$

From the computed initial torque deviation LEARNING_TRQ the next speed-change learning correction value LEARNING-UCTRL is computed as follows:

$$LEARNING\_UCTRL = K10 \times K1 \times LEARNING\_TRQ \quad (31)$$

where K10 and K1 are torque ratios.

If step S38 is ended, the current routine will be ended and the next routine will be repeated.

As previously described, in the case where, after timing B, inertia phase is detected but the maximum torque value is not detected, steps S10 to S26, steps S28 to S34, step S36, and a loop of step S38 to RETURN step are repeated. With this operation, the initial operating pressure UCTRL0 of oil pressure is output to the oil pressure solenoid 8, and the supply of oil pressure to the friction engaging elements in the power train 4 is controlled by the oil pressure control unit 7, thereby controlling the engaging force between the friction elements. The aforementioned output torque height TRQOUTH is held until timing D (TRQOUTH←TRQOUT), and the computation in the processing loop (1) is continued.

Processing loop (4); period from timing D (torque reduction start point) to timing E:

If the inertia phase is detected (for example, the torque phase ends) and also the maximum torque value is detected, step S28 will advance to step S40. In step S40 it is judged whether or not the inertia phase has ended. If the inertia phase has not been ended, step S40 will advance to step S42. In step S42, feedforward control and feedback control are started.

Also, in this loop, since the maximum torque value was detected, target rotational speed NTBNR and target torque (output torque increase quantity TRQOUTR and next-stage torque quantity TRQOUT2ND) are computed in step S20.

The target rotational speed NTBNR is computed by the following Eq. (32).

$$NTBNR = GEAR \times NOUT - NTBNRO \quad (32)$$

The output torque increase quantity TRQOUTR is computed by the following Eq. (33).

$$TRQOUTR = (TRQOUT2ND - TRQOUTH) \times SAFE \quad (33)$$

where SAFE is correction gain.

The next-stage torque quantity TRQOUT2ND is computed by the following Eq. (34).

$$TRQOUT2ND = K6 \times K7 \times TRQENG0 \quad (34)$$

The engine torque TRQENG0 in Eq. (34) is computed by the following Eq. (35).

$$TRQENG0 = (1 - K7) \times TRQOUTSH + \\ (1/K8) \times TRQOUT - K20 \times DNTBNR \times K21 \times RTDTRQ \quad (35)$$

The reason why the aforementioned computation is performed is that the output torque which is increased during a speed-change is predicted and then the predicted torque is used as a target value. On the other hand, the output torque TRQOUT2ND at the time of the end of a speed-change can not be determined because engine torque fluctuates during a speed-change. For this reason, engine torque is estimated in sequence from detected output torque, a torque reduction instruction value, and from target rotational acceleration.

In the processing to start feedforward control and feedback control in step S42, the output values UCTRL1 and RTDRQ1 of the feedforward control and the output values UCTRL2 and RTDRQ2 of the feedback control are output. Since the output values UCTRL1 and RTDRQ1 of the feedforward control have been computed in the aforementioned step S22, the output values that have been set will be output. The output values UCTRL2 and RTDRQ2 of the feedback control are computed by the following Eq. (36), based on rotational deviation ΔNTBN and output torque deviation Δ TRQOUT.

$$\begin{bmatrix} UCTRL2 \\ RTDTRQ2 \end{bmatrix} = \begin{bmatrix} C2 \end{bmatrix} \begin{bmatrix} \Delta NTBN \\ \Delta TRQOUT \end{bmatrix} \quad (36)$$

In step S36 the operating oil pressure UCTRL and the torque reduction output RTDTRQ are output. In this case, the operating oil pressure UCTRL and the torque reduction output RTDTRQ are computed by the aforementioned Eqs. (25) and (26). In this routine, since the output values UCTRL1 and RTDRQ1 of feedforward control and the output values UCTRL2 and RTDRQ2 of feedback control have all been set to computed values, the feedforward control and feedback control are performed. With this, the operating oil pressure UCTRL is output from the speed-changing control unit 6 to the oil pressure solenoid 8. The oil pressure in the oil pressure control unit 7 is controlled, and the operating positions of a plurality of friction engaging elements are switched, so that mechanical speed changing is performed.

In addition, the torque reduction output RTDTRQ as a torque reduction instruction is output from the speed-changing control unit 6 to the engine control unit 12 in performing speed changing control, and the ignition timing of the engine 1 is controlled by the engine control unit 12, so that engine torque is reduced.

Next, in step S38 the next speed-change learning correction value LEARNING_UCTRL is set according to Eq. (27), and step S38 is returned to step S40. Therefore, in the case where feedforward control and feedback control are performed, learning correction is performed by the aforementioned control.

Processing loop (5); period from timing E to timing F:

In step S40, in the case where the inertia phase has been ended, in step S44 it is judged whether or not TIMER3 has been greater than a speed-changing end period ENDCTRL. If TIMER3 is less than the speed-changing end period ENDCTRL, step S44 will advance to step S46. In step S46 the aforementioned feedforward control and feedback control are ended, and each of the respective output values UCTRL1, RTDRQ1, UCTRL2, and RTDRQ2 is set to 0. Next, in step S48 a sequence control for the operating oil pressure is performed, and step 36 and steps thereafter are performed. At this time, timing E is the end point of the feedforward control and feedback control and also is the end point of the torque reducing operation. At this time, in order to prevent an increase in the output torque which is caused by the end of the torque reducing operation, an operation for reducing oil pressure is performed. The oil pressure reduction quantity UAO2 is computed by the following Eq. (37).

$$UAO2 = K12 \times RTDTRQ \tag{37}$$

Thereafter, oil pressure is increased with certain inclination to prevent engine racing.

Processing loop (6); timing F and after timing F:

In the next routine and the routines thereafter, if TIMER3 becomes longer than the speed-changing end period ENDCTRL, step S44 will advance to step S50. In step S50, speed changing control is ended. The operating oil pressure in the sequence control is set to a maximum value UCTRLMAX, and step S36 and steps thereafter are performed.

As has been described hereinbefore, the present invention has set two control quantities: engagement transition oil pressure and engine output torque. With the engagement transition oil pressure, the turbine rotational speed NTBN is controlled, and with the engine output torque, the output shaft torque TRQOUT of the automatic transmission 2 is controlled. In addition, the present invention has set what is changed by a speed-change (for example, target value of the turbine rotational speed of the automatic transmission 2: NTBNR) and a parameter whose value changes in parallel to a speed changing operation (for example, target value of the output shaft torque of the automatic transmission: TRQOUTR), as target values, and the output values of feedforward and feedback controls and a prescriptive model are calculated. In the feedforward control, the turbine rotational speed NTBN and the transmission output shaft torque TRQOUT are controlled in correspondence with the respective target values. For the output values of the prescriptive model, in order to end a speed-change in a predetermined time, the prescriptive model NTBNM of the turbine rotational speed is set in correspondence with the target value NTBNR of the turbine rotational speed so that the inclination of the turbine rotational speed NTBN is made constant. Also, in order to smoothly transfer the transmission output shaft torque to a speed-change stage during a speed-change (for example, first-speed torque to second-speed torque), the prescriptive model TRQOUTM of the transmission output shaft torque is set and output in correspondence with the target transmission output shaft torque TRQOUTR.

Furthermore, the turbine rotational speed NTBN and the transmission output shaft torque TRQOUT are detected and the deviation between the detected NTBN and the prescriptive model NTBNM and the deviation between the detected TRQOUT and the prescriptive model TRQOUTM are computed, thereby performing feedback control. By performing the speed-change of the automatic transmission 2 in the aforementioned way, the feedforward control has been designed so that the two control quantities with respect to the turbine rotational speed and the transmission output shaft torque do not interfere with each other. Similarly, the feedback control has been designed so that the output signals UCTRL2 and RTDTRQ2 do not interfere with each other. Also, for the prescriptive model, the optimum values of two control quantities with respect to the turbine rotational speed and the transmission output shaft torque have been set from the two viewpoints of a reduction in speed-changing shock and an enhancement in the durability of friction engaging elements. Therefore, the target values of what is changed by a speed-change (e.g., turbine rotational speed during a speed-change: NTBNR) and a parameter whose value changes in parallel to a speed changing operation (e.g., transmission output shaft torque: TRQOUTR) are optimally set and also the interference between the control quantities can be prevented, and consequently, the compatibility of a reduction in the speed-changing shock and an enhancement in the durability of friction engaging elements can be reliably performed.

For example, even when the transmission output shaft torque is greater than its target value and also the turbine rotational speed is less than its target value, the target values are optimally set, and the turbine rotational speed NTBN is increased by the engagement transition oil pressure and the transmission output shaft torque TRQOUT is decreased by the engine output torque so that optimum target values are obtained. At this time, the control quantities do not interfere with each other. Therefore, the present invention can prevent the situation where the transmission output shaft torque is reduced too much and the turbine rotational speed cannot be increased up to a target value, as in the prior art. Thus, the control of the case of two target values can be sufficiently performed, and a reduction in the speed-changing shock and an enhancement in the durability of friction engaging elements are compatible with each other.

In the aforementioned embodiment, although engine speed has been increased from first speed to second speed, the present invention is not limited to this speed-change. Even in other speed-changes, similar control can be performed to prevent interference between control quantities. In addition, even when engine speed is reduced down from second speed to first speed, similar advantages are obtainable by performing similar control.

While the invention has been described with reference to a preferred embodiment thereof, the invention is not to be limited to the details given herein, but may be modified within the scope of the appended claims.

What is claimed is:

1. A control apparatus for an automatic transmission, comprising:

oil pressure control means for controlling engagement transition oil pressure which is supplied to friction engaging elements so that a parameter changed by a speed-change is changed along a locus of a predetermined target value;

engine torque control means for controlling a quantity of change in engine output torque during a speed-change so that a parameter whose value changes in parallel to a speed changing operation has an optimum change characteristic;

oil pressure correction means for correcting said engagement transition oil pressure, based on the quantity of change in said engine output torque, in controlling said engagement transition oil pressure; and engine torque correction means for correcting the quantity of change in said engine output torque, based on said engagement transition oil pressure, in controlling the quantity of change in said engine output torque.

2. A control apparatus for an automatic transmission, comprising:

oil pressure control means for controlling engagement transition oil pressure which is supplied to friction engaging elements so that a parameter changed by a speed-change is changed along a locus of a predetermined target value;

engine torque control means for controlling a quantity of change in engine output torque during a speed-change so that a parameter whose value changes in parallel to a speed changing operation has an optimum change characteristic;

oil pressure correction means for correcting said engagement transition oil pressure, based on the quantity of change in said engine output torque, in controlling said engagement transition oil pressure; and engine torque correction means for correcting the quantity of change in said engine output torque, based on said engagement transition oil pressure, in controlling the quantity of change in said engine output torque, wherein said parameter changed by a speed-change is turbine rotational speed of a torque converter in the automatic transmission and wherein said oil pressure control means sets a target value so that said turbine rotational speed during a speed-change is changed with a predetermined rotation change rate, in order to end a speed-change in a predetermined time, and controls said engagement transition oil pressure which is supplied to said friction engaging elements so that said turbine rotational speed changes along said target value.

3. A control apparatus for an automatic transmission, comprising:

oil pressure control means for controlling engagement transition oil pressure which is supplied to friction engaging elements so that a parameter changed by a speed-change is changed along a locus of a predetermined target value;

engine torque control means for controlling a quantity of change in engine output torque during a speed-change so that a parameter whose value changes in parallel to a speed changing operation has an optimum change characteristic;

oil pressure correction means for correcting said engagement transition oil pressure, based on the quantity of change in said engine output torque, in controlling said engagement transition oil pressure; and engine torque correction means for correcting the quantity of change in said engine output torque, based on said engagement transition oil pressure, in controlling the quantity of change in said engine output torque, wherein said parameter whose value changes in parallel to a speed changing operation is torque of an output shaft in the automatic transmission and wherein said engine torque control means sets a target value so that the transmission output shaft torque is smoothly shifted from the current speed-change stage to the next speed-change stage, and controls the quantity of change in the engine output torque so as to change along said target value.

4. A control apparatus for an automatic transmission, comprising:

oil pressure control means for controlling engagement transition oil pressure which is supplied to friction engaging elements so that a parameter changed by a speed-change is changed along a locus of a predetermined target value;

engine torque control means for controlling a quantity of change in engine output torque during a speed-change so that a parameter whose value changes in parallel to a speed changing operation has an optimum change characteristic;

oil pressure correction means for correcting said engagement transition oil pressure, based on the quantity of change in said engine output torque, in controlling said engagement transition oil pressure; and engine torque correction means for correcting the quantity of change in said engine output torque, based on said engagement transition oil pressure, in controlling the quantity of change in said engine output torque, wherein the control of said engagement transition oil pressure and the control of the quantity of change in the engine output torque include at least feedforward control.

5. The control apparatus for an automatic transmission as set forth in claim 1, wherein the quantity of change in said engine output torque is at least one of among a quantity of change in engine ignition timing, a quantity of change in fuel injection, a quantity of change in engine valve timing, and a quantity of change in engine suction air.

6. A control apparatus for an automatic transmission, comprising:

oil pressure control means for controlling engagement transition oil pressure which is supplied to friction engaging elements so that a parameter changed by a speed-change is changed along a locus of a predetermined target value;

engine torque control means for controlling a quantity of change in engine output torque during a speed-change so that a parameter whose value changes in parallel to a speed changing operation has an optimum change characteristic;

oil pressure correction means for correcting said engagement transition oil pressure, based on the quantity of change in said engine output torque, in controlling said engagement transition oil pressure; and engine torque correction means for correcting the quantity of change in said engine output torque, based on said engagement transition oil pressure, in controlling the quantity of change in said engine output torque, wherein:

when a period is ended which controls the engagement transition oil pressure which is supplied to friction engaging elements so that said parameter changed by a speed-change is changed along a locus of a predetermined target value and when a period is ended which controls the quantity of change in the engine output torque during a speed-change so that said parameter whose value changes in parallel to a speed changing operation has an optimum change characteristic, the engagement transition pressure is reduced in order to suppress an increase in the output torque which is caused by an end of a torque reducing operation; and thereafter, the engagement transition oil pressure is increased with certain inclination.

7. The control apparatus for an automatic transmission as set forth in claim 1, wherein deviation between the last control value and the current control value is learned and the learned deviation is used as a learned value for the next speed-change.

8. A control apparatus for an automatic transmission, comprising:

oil pressure control means for controlling engagement transition oil pressure which is supplied to friction engaging elements so that a parameter changed by a speed-change is changed along a locus of a predetermined target value;

engine torque control means for controlling a quantity of change in engine output torque during a speed-change so that a parameter whose value changes in parallel to a speed changing operation has an optimum change characteristic;

oil pressure correction means for correcting said engagement transition oil pressure, based on the quantity of change in said engine output torque, in controlling said engagement transition oil pressure; and engine torque correction means for correcting the quantity of change in said engine output torque, based on said engagement transition oil pressure, in controlling the quantity of change in said engine output torque, wherein the output torque of the automatic transmission that is increased during a speed-change is predicted and the predicted output torque is set as a target value for output torque.

9. A control apparatus for an automatic transmission, comprising:

oil pressure control means for controlling engagement transition oil pressure which is supplied to friction engaging elements so that a parameter changed by a speed-change is changed along a locus of a predetermined target value;

engine torque control means for controlling a quantity of change in engine output torque during a speed-change so that a parameter whose value changes in parallel to a speed changing operation has an optimum change characteristic;

oil pressure correction means for correcting said engagement transition oil pressure, based on the quantity of change in said engine output torque, in controlling said engagement transition oil pressure; and engine torque correction means for correcting the quantity of change in said engine output torque, based on said engagement transition oil pressure, in controlling the quantity of change in said engine output torque, wherein the control of said engagement transition oil pressure and the control of the quantity of change in the engine output torque include at least feedback control.

* * * * *